United States Patent
O'Donnell et al.

[11] Patent Number: 5,923,770
[45] Date of Patent: Jul. 13, 1999

[54] 3D CARDIAC MOTION RECOVERY SYSTEM USING TAGGED MR IMAGES

[75] Inventors: Thomas O'Donnell, Englewood, N.J.; Terrance E. Boult, Bethlehem, Pa.; Alok Gupta, East Brunswick, N.J.

[73] Assignee: Siemens Corporate Research, Inc., Princeton, N.J.

[21] Appl. No.: 08/724,698

[22] Filed: Sep. 30, 1996

[51] Int. Cl.$^6$ .............................. G06K 9/00; C07C 15/00
[52] U.S. Cl. ............................................. 382/131; 600/416
[58] Field of Search ..................................... 382/128, 131, 382/132, 154; 345/419, 420, 423; 600/416; 128/922

[56] References Cited

U.S. PATENT DOCUMENTS

| | | | |
|---|---|---|---|
| 5,065,435 | 11/1991 | Oe | 382/6 |
| 5,360,006 | 11/1994 | Geiser et al. | 128/653.1 |
| 5,435,310 | 7/1995 | Sheehan et al. | 128/653.1 |
| 5,517,602 | 5/1996 | Natarajan | 395/119 |
| 5,570,430 | 10/1996 | Sheehan et al. | 382/128 |
| 5,689,577 | 11/1997 | Arata | 382/128 |

FOREIGN PATENT DOCUMENTS

WO 94/24640 10/1994 WIPO ................................... 382/128

*Primary Examiner*—Andrew W. Johns
*Attorney, Agent, or Firm*—Donald B. Paschburg

[57] ABSTRACT

A system for recovering cardiac motion includes an overall model, a geodesic-like prismoidal tessellation of the model and constant volume constraints. The overall model includes local deformations and a scaleable default model having a global component and parametric offsets. The offsets provide two features. First, they help to form an expected model shape which facilitates appropriate model data correspondences. Second, they scale with the global component to maintain the expected shape even in the presence of large global deformations. The system is applied to the recovery of 3-D cardiac motion from a volunteer dataset of tagged-MR images.

18 Claims, 10 Drawing Sheets

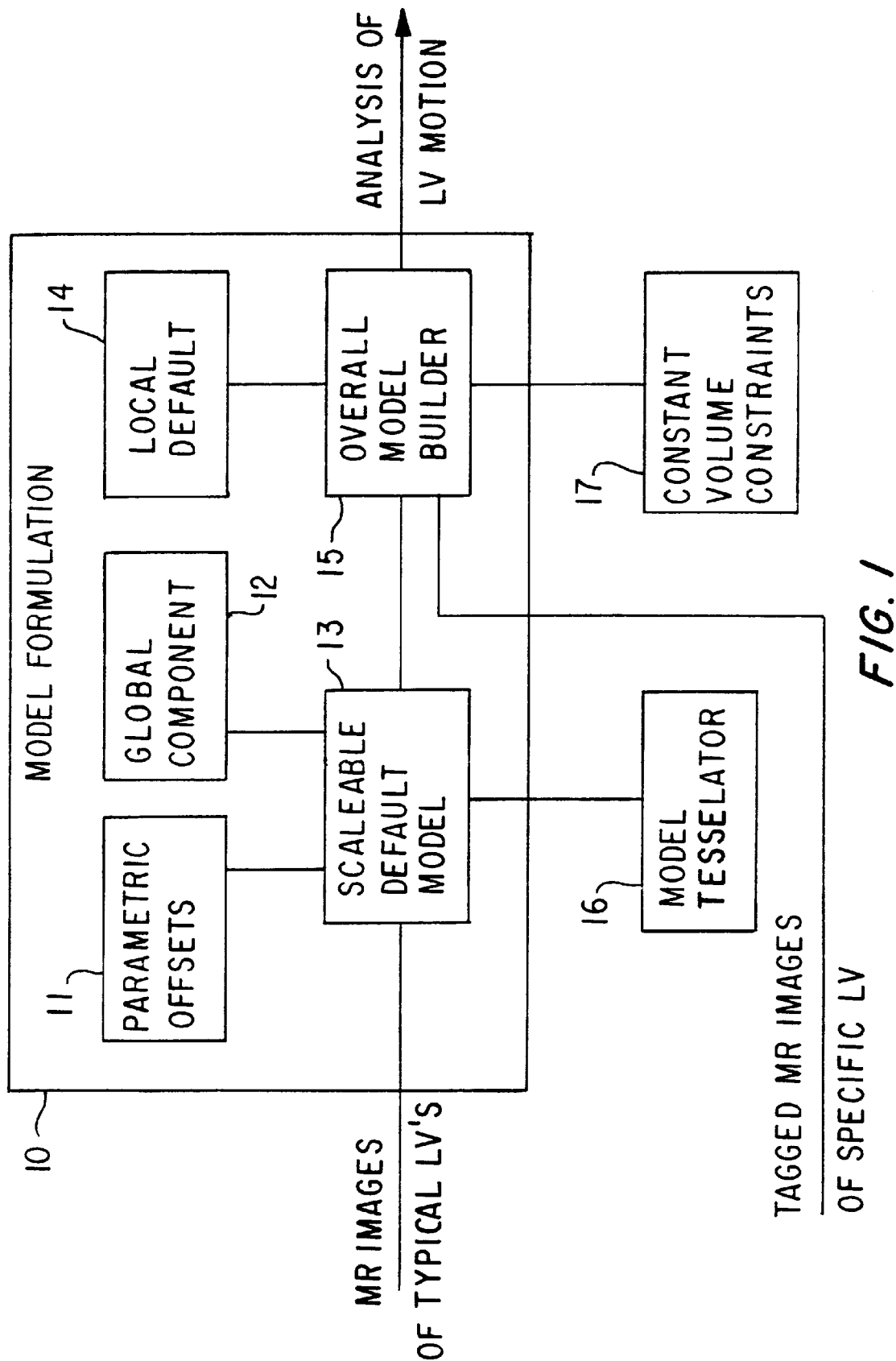

3D CARDIAC MOTION RECOVERY SYSTEM USING TAGGED MR IMAGES

BACKGROUND OF THE INVENTION

1. Field of the Invention

The present invention relates to the recovery of 3D cardiac motion from a volunteer dataset of tagged MR images and more specifically to a system that includes global models with parametric offsets, constant volume constraints for cardiac motion recovery and tessellation of the model.

2. Description of the Prior Art

Different forms of hybrid models have been described in vision literature over the past several years. The following will focus only on those models most closely related to the present invention. In the models related to the present invention, the global component has been described by a parametric model or as a series of vibrational modes. Parametric models are described by D. Terzopoulos and D. Metaxas in "Dynamic 3D Models With Local And Global Deformations: Deformable Superquadrics", *IEEE PAMI*, 13 (7):703–714, 1991; by J. Park, D. Metaxas and L. Axel in "Volumetric Deformzible Models With Parametric Functions: A New Approach To The 3D Motion Analysis Of The LV From MRI-SPAMM", *Proceedings of the 5th IEEE ICCV*, MIT, Mass., pages 700–705, 1995; and by J. Park, D. Metaxas and A. Young in "Deformable Models With Parameter Functions: Application To Heart Wall Modeling", *Proceedings of the IEEE CVPR*, Seattle, Wash., pages 437–442, 1994. Vibrational modes are described by A. Pentland in "The Thingworld Modeling System: Virtual Sculpting By Modal Forces", *Proceedings of SIGGRAPH*, pages 143–144, 1990; and by B. C. Vemuri and A. Radisavljevic in "From Global To Local, A Continuum Of Shape Models With Fractal Priors", *IEEE CVPR*, pages 307–313, 1993.

A. Pentland and J. Williams in "Good Vibrations: Modal Dynamics For Graphics And Animation", *Computer Graphics*, 23(3):215–222, July 1989, presented the first use of hybrid modeling in the programming environment, ThingWorld. The system coupled a global geometric modal representation with a local description of the object's dynamics.

Terzopoulos and Metaxas included a global superquadric component in their deformable model. The deformations from this base superquadric model take( the form of a thin membrane spline described using the Finite Element Method (FEM). Unlike Pentland's model, th(e underlying superquadric as well as the spline mesh deformed to fit the data.

Park, Metaxas and Young developed a thick ellipsoidal model for recovering 3-D cardiac motion from tagged-MR data. Their model, developed independently and in parallel with T. O'Donnell, A. Gupta and T. Boult in "The Hybird Volumetric Ventriculoid: A model For MR-SPAMN 3-D Analysis", *Proceedings of Computers in Cardiology, IEEE*, 1995, provided a piecewise plot of the change in relevant global LV characteristics. The.Lr model, however, does not report strain and is recovered under the unrealistic assumption that the tag columns remain straight over the cardiac cycle. Their modiel formulation differs from the model formulation of the present invention in the following ways. First, their model does not have distinct global and local components. They use linear piecewise parametric functions to express local deformations. Second, the default shape of the model is a thick ellipsoid rather than a shape closer to a real LV. Third, their model does not provide a concise description of the LV movement. Rather, piecewise plots describe the motion. Fourth, their model assumes a dense tag acquisition and therefore makes no use of "regularizing" constraints.

O'Donnell, Gupta, and Boult presented a thick superelliptic model, the HVV. While there is a clear distinction between global and offset components in this model, it differs from the approach of the present invention in that the offsets are not parametric. In addition, the model fitting was influenced via an internodal stretching penalty as opposed to current constant volume constraint of the present invention.

W. O'Dell, C. Moore, W. Hunter, E. Zerhouni and E. McVeigh in "Displacement Field Fitting For Calculating 3D Myocardial Deformations From Tagged MR Images", *Radiology*, 195:829–835, 1995, recovered 3-D cardiac motion using a prolate spheroidal model. The coefficients of their series expansion do not, however, give an intuition as to the shape and movement of the LV. Also, their tags image as a series of parallel line(s rather than a 2-D grid, inviting the aperture problem.

Finally, T. Denny and J. Prince in "3D Displacement Field Reconstruction From Planar Tagged Cardiac MR Images", *Proceedings of the IEEE Workshop on Biomedical Image Analysis*, pages 51–60, 1994, employed a multidimensional stochastic model for measuring cardiac motion from tagged-MR images. They used the Fisher estimation framework to approximate the movement of the LV from sparse displacement measurements with cons-ant volume constraints.

SUMMARY OF THE INVENTION

The present invention includes an overall model, a geodesic-like prismoidal tessellation of the model and constant volume constraints. The overall model is a new solid shape model formulation that includes built-in offsets from a base global component (e.g. an ellipsoid) which are functions of the global component's parameters. The offsets provide two features. First, they help to form an expected model shape which facilitates appropriate model data correspondences. Second, they scale with the base global model to maintain the expected shape even in the presence of large global deformations. The geodesic-like prismoidal tessellation of the model provides for more stable fits. The constant volume constraints are imposed to infer the motion of the left ventricle where the tag intersections are sparsely distributed. The present invention is applied to the recovery of 3-D cardiac motion from a volunteer dataset of tagged-MR images.

BRIEF DESCRIPTION OF THE DRAWINGS

FIG. 1 illustrates a block diagram of the present invention.

DETAILED DESCRIPTION OF THE INVENTION

Figure 2A:
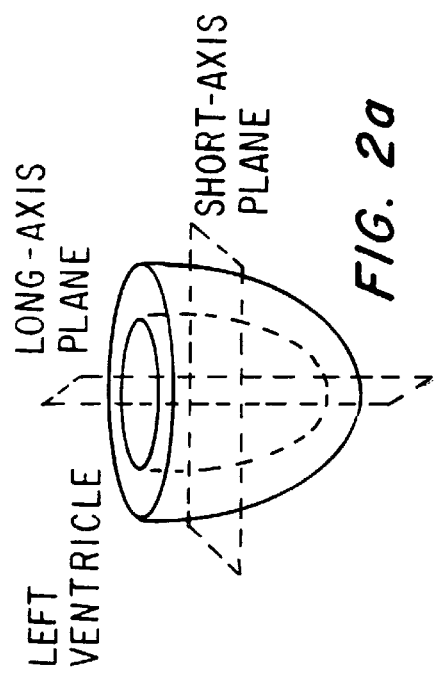
FIGS. 2a, 2b and 2c illustrate fitting a single model to data from two orthogonal tag acquisitions in order to recover an estimate of 3-D LV motion.

The present invention, as illustrated in FIG. 1, includes three major elements. First, is the introduction of a novel modeling formulation 10 which includes a global model with parametric offsets. This model formulation 10 is capable of describing an expected (or default) configuration which facilitates appropriate model scaling as well as proper model-data correspondences. This model formulation 10 may be considered a type of hybrid model in that it is an amalgam of a global (parametric) model and a local (spline-like) model. The model formulation 10 is implemented in a solid, thick-walled ellipsoid model for describing the Left Ventricle (LV) of the heart. The input to model formulation 10 are MR images of typical LV's. This data with parametric offsets 11 and global component 12 provide a scaleable default model 13. An input of tagged MR images of the specific LV with scaleable default model 13 and local deformations 14 provide overall model builder 15. The output of model formulation 10 is an analysis of LV motion.

The second major element of the present invention is the introduction of constant volume constraints 17 to cardiac motion recovery. Constant volume constraints 17 interface with overall model builder 15. It is postulated that the volume of a region of tissue remains approximately fixed over the cardiac cycle and this is enforced during motion tracking. The third element of the present invention is model tesselator 16 which interfaces with scaleable default model 13. Model formulation 10 is described by discrete nodes linearly interpolated to form prismoidal elements. To provide high stability, these elements are arranged in a unique configuration based on the geodesic dome developed by R. Buckminster Fuller as described by H. Kenner in Geodesic Math And How To Use It, Berkeley University of California Press, 1976. Model formulation 10 is demonstrated fitting to segmented tagged-MR image data.

As a form of hybrid model, global models with parametric offsets have a twofold goal in recovery. First, to extract from a data set a gross description of the shape and movement for comparison and classification via global parameters. Second, to retain a detailed description of the data for geometric measurements such as surface area and material strain. This is made possible through "displacements" from a globally scaleable default shape. The model form of the present invention is distinguished by the incorporation of scaleable (parametric) offsets in the default shape. An instance of this formulation is invoked which is a variation of the Hybrid Volumetric Ventriculoid described by O'Donnell, Gupta, and Boult, a model for recovering shape and motion from tagged-MR data sets.

Figure 2B:
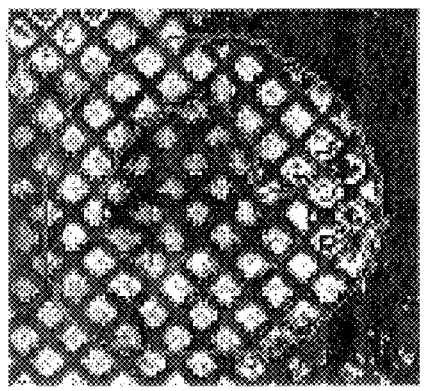
Figure 2C:
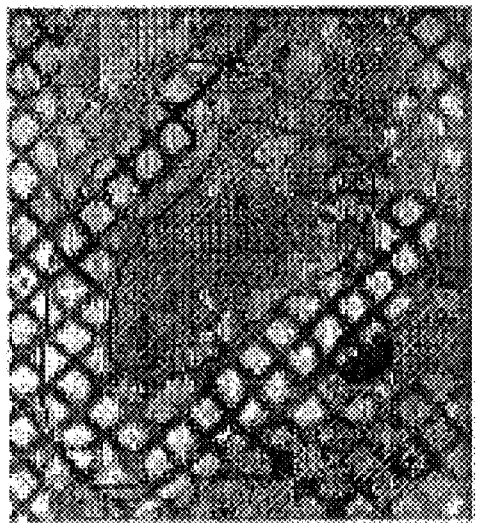

In standard MR, the deforming heart tissue appears homogeneous. This absence of landmarks prevents the recovery of motion within the myocardium. Advances in magnetic resonance imaging have resulted in a form of non-invasive tagging (e.g. SPAMM—SPatial Modulation of Magnetization) which allows the creation of transient markers (or tags) in heart tissue. In FIGS. 2a, 2b and 2c a single model is fitted to the data from two orthogonal tag acquisitions in order to recover an estimate of the 3-D LV motion. The tags form a grid in the MR imaging plane. By tracking the tag grid intersection points over time, a 2-D projection of the true 3-D motion can be extracted. To estimate 3-D cardiac motion, there is a fusion of acquisitions of the same heart taken from different views (usually orthogonal) registered in time using a model-based approach. This is described by A. A. Young and L. Axel in "Three-dimensional Motion And Deformation Of The Heart Wall: Estimation With Spatial Modulation Of Magnetization—A Model-based Approach", Radiology, 185(1):241–247, 1992.

Due to the general sparsity of data, a constraint is imposed to insure that model elements maintain a relatively constant volume during fitting. For the cardiac domain, it is assumed that constant volume constraints are more appropriate than minimal inter-nodal stretching constraints as described by O'Donnell, Gupta, and Boult, which attempt to maintain initial element edge lengths. While the constant volume constraint itself is not novel (A. Rappoport, A. Sheffer and M. Bercovier, "Volume Preserving Free-Form Solids", Proceedings of ACM Solid Modeling, pages 361–372, 1995) the present invention is one of the first times (T. Denny and J. Prince) the constant volume constraint is applied to cardiac motion recovery from image data. Its incorporation follows naturally from the fact that myocardial tissue is mostly water and thus not substantially compressible.

Under constraints such as constant volume or minimal inter-nodal stretching, the model structure is subject to stress. In order to maintain stability in recovery and lessen the bias inherent in its discrete implementation, it becomes important that the model have sufficient structural support. A unique tessellation of the model of the present invention is introduced which provides this support by basing the nodal distribution on geodesic domes.

Figure 3A:
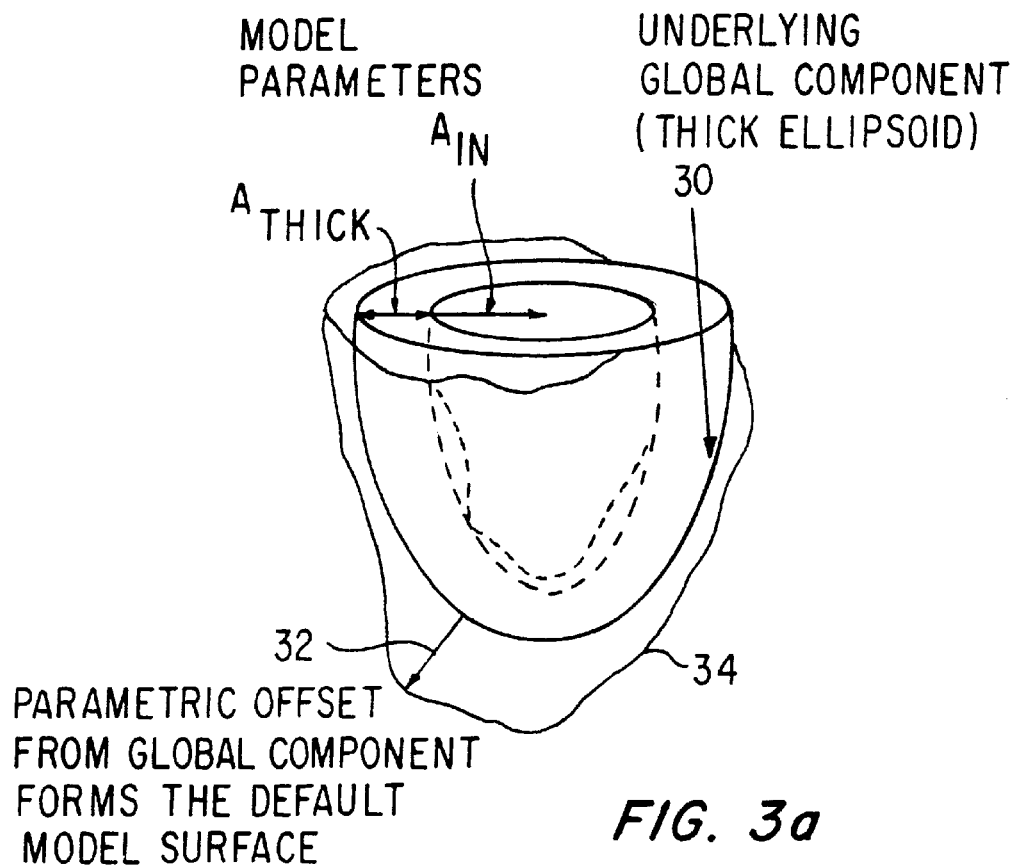
FIGS. 3a and 3b illustrate model formulation which is made up of three components. The base global model and parametric offsets are shown in FIG. 3a and local deformations forming the overall model are shown in FIG. 3b.
Figure 3B:
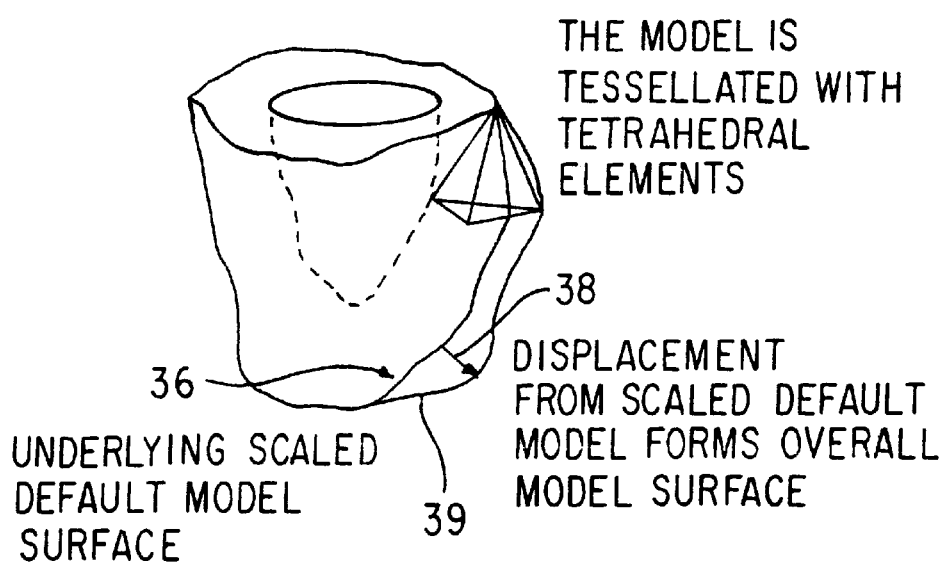

The model formulation of the present invention is made up of three components; base global model, parametric offsets, and local deformations. This is illustrated in FIGS. 3a and 3b. From FIG. 3a, the base global model 30 and parametric offsets 32 form the scaleable default model 34. From FIG. 3b, the scaled default model 36 plus local deformations 38 form the overall model 39. The local deformations tailor a scaled default model to a specific dataset. The length and direction of the local deformations are not parametric. More concisely,

| Scaleable Default Model | = | Global Component<br>\|<br>Parametric Offsets |
|---|---|---|
| Overall Model | = | Scaleable Default Model<br>+<br>Local Deformations |

The local deformations are used to tailor the scaled default model to a specific dataset. The following will describe each component in detail using the HVV as an example A point c(x,y,z) on the global component is described by $$x(u,v,\alpha) = a_1(\alpha)\cos(u)\cos(v)$$
$$y(u,v,\alpha) = a_2(\alpha)\cos(u)\sin(v)$$
$$z(u,\alpha) = a_3(\alpha)\sin(u)$$
$$0 \leq u \leq \pi/2 \quad -\pi \leq v \leq \pi, \quad (1)$$

where the parameters, $$a_i(\alpha) = a_{i_{inner}}(1-\alpha) + a_{i_{outer}}\alpha \quad (2)$$

for i={1,2,3}, are defined as functions of the wall radii. At $\alpha=0$ and 1 the model describes the inner walls and outer walls respectively.

The global component of the present invention is augmented with tapering (along the x and y axes), bending and twisting using the variations of these formulations * described by D. Terzopoulos and D. Metaxas. The twisting of the inner and outer walls are controlled by independent parameters, twist$_{inner}$ and twist$_{outer}$, in a fashion similar to Equation 2.

Parametric offsets (from the global component) are introduced to the standard hybrid model formulation in order to create a default or "rest" shape which resembles the object undergoing recovery. Thus, regions where data is sparse are more likely to be estimated correctly. The inclusion results in a significantly more accurate default shape than could be modeled with the implicit parametric global component alone even with its glob)al deformations (e.g., bending). And, it is possible to describe this complex shape with a very few parameters.

Figure 4:
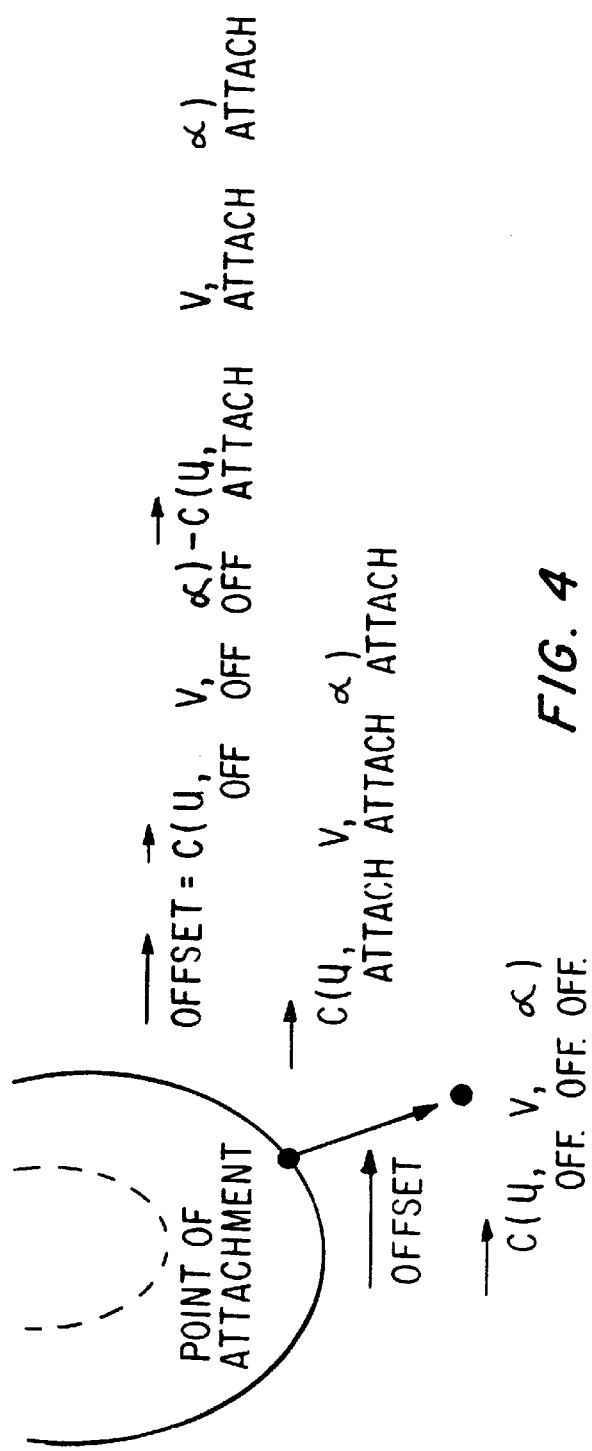
FIG. 4 illustrates calculation of parametric, offset vectors.

In all other hybrid model formulations which include what may be thought of as offsets, the offsets are described simply by a Cartesian vector (the "offset vector") and a point of attachment to the base global model. Parametric offsets, on the other hand, are described by a set of intrinsic parameter values with associated points of attachment. In the case of the thick ellipsoid model described above, parametric offsets are a trio ($u_{off}, v_{off}, \alpha_{off}$) plus a point of attachment. The offset vector itself is calculated by evaluating the base global model (Equation 1) at ($u_{off}, v_{off}, \alpha_{off}$), and taking the vector difference with the point of attachment ($U_{attach}, v_{attach}, \alpha_{attach}$). This is illustrated in FIG. 4.

Note that when fitting to a specific dataset, these values will have already been calculated and fixed. While the values are fixed, the offset vectors scale with the base global model's extrinsic parameters. Following this route allows for the scaling of a complex default model appropriately. Below, parametric offsets with non-parametric offsets will be compared.

Calculation of the values ($u_{off}, v_{off}, \alpha_{off}$) is performed on a dataset describing a typical instance or average of instances of the type of object likely to be recovered. The values are found in the direction of the gradient $$((\partial c\ (u_{off}, v_{off}, \alpha_{off})/\partial u_{off})\ , (\partial c\ (u_{off}, v_{off}, \alpha_{off})/\partial v_{off}), (\partial c\ (u_{off}, v_{off}, \alpha_{off})/\partial \alpha_{off}))$$

Figure 5A:
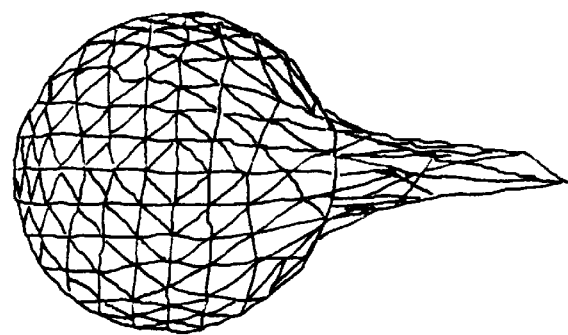
FIGS. 5a, 5b and 5c illustrate a spherical model with offsets, a radially scaled model with parametric offsets and a radially scaled model with non-parametric offsets respectively.
Figure 5B:
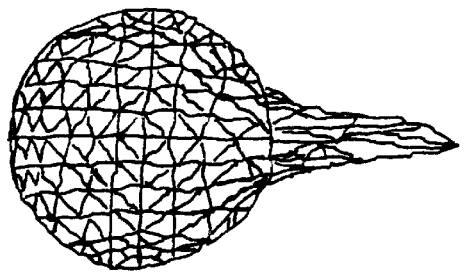
Figure 5C:
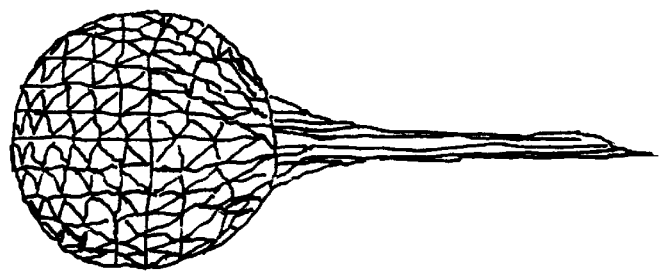

The following will discuss parametric vs non-parametric offsets. Non-parametric offsets were introduced to the hybrid modeling paradigm by O'Donnell, Gupta, and Boult. Since the non-parametric offsets do not scale, the default shape may become extremely distorted as the base global model deforms. This is illustrated in FIGS. 5a, 5b and 5c. FIG. 5a illustrates a spherical model with offsets. FIG. 5b illustrates a radially scaled model with parametric offsets. Note that the overall structure of the model is preserved. FIG. 5c illustrates a radially scaled model with non-parametric offsets. The offsets remain fixed as the global parameters change, resulting in a distorted shape. Note that the scaling demonstrated in this figure could have been implemented as a simple uniform scaling of space. However, global models with parametric offsets are capable of much more sophisticated adjustments.

Figure 6A:
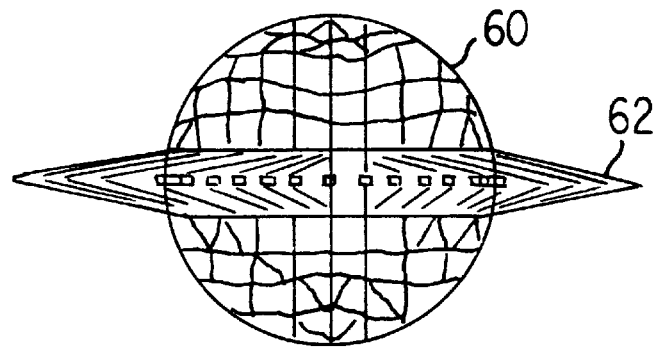
FIGS. 6a, 6b and 6c illustrate an original model, a globally twisted model with parametric offsets and a globally twisted model with non-parametric offsets respectively.
Figure 6B:
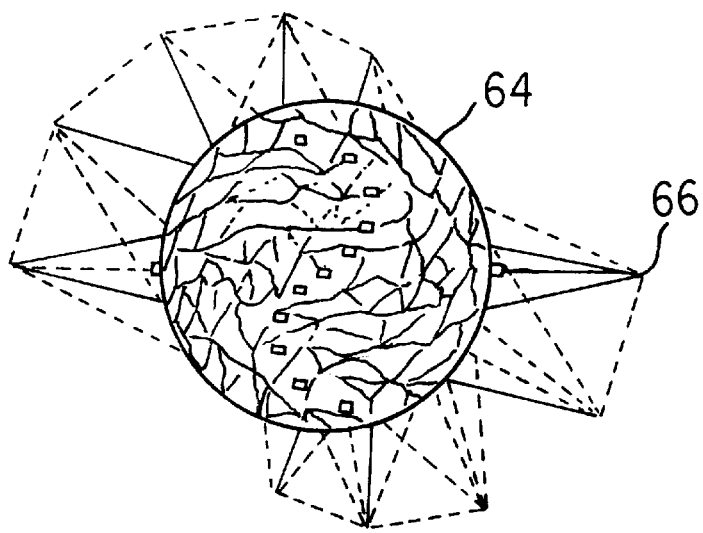
Figure 6C:
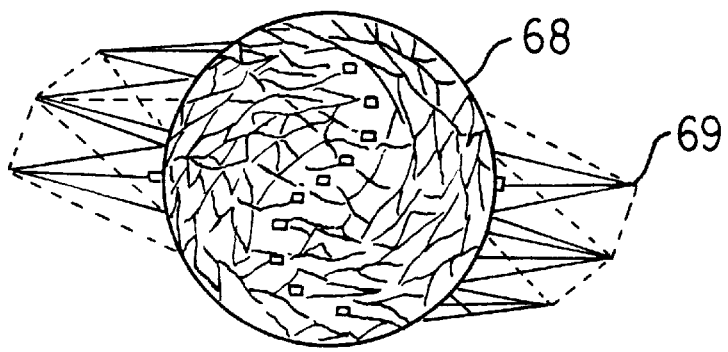

FIGS. 6a, 6b and 6c show an example of such an adjustment. FIG. 6a illustrates an original model having base global model 60 and offsets 62. FIG. 6b illustrates a globally twisted model 64 with parametric offsets 66. The overall structure looks natural since the offsets adjust to the new base component shape. FIG. 6c illustrates a globally twisted model 68 with non-parametric offsets 69. The offsets do not adjust to the new global component configuration.

A model with offsets is twisted. In the case that the offsets are non-parametric they seem to lie nearly flat on the model in places. This is because although the position where they are attached to the model changes in space, the offsets remain the same Cartesian vectors in length and direction. The result is a non-intuitive shape. In the case where the offsets are parametric, they adjust to the new model attachment position. The resulting shape is more natural since the offsets are normal to the surface just as they were in the original configuration.

Local deformations are Cartesian vectors with a point of attachment to the default model. In other formulations they have typically been termed "displacements". This is described by D. Terzopoulos and D. Metaxas and by B. C. Vemuri and A. Radisavljevic. The term "local deformation" is employed in order to clearly distinguish them from offsets.

Local deformations come into play after the scaling of the default model to a specific dataset. The deformations are necessary to tailor the model to a specific dataset if the scaled default shape does not sufficiently approximate the data. Since local deformations cause the model to deviate from the expected shape (the default model), their presence incurs an optional fitting penalty. This is further discussed below.

The following will describe the present invention's new form of tessellation which links two geodesic domes; one describing the inner wall of the LV and the other describing the outer wall. (Note that this formulation may be easily extended to any number of layers of domes between the inner and outer walls.) Since the domes are tessellated by triangles, linking them forms a set of prism shaped elements. Each model node is guaranteed to have no less than two and no more than six elements associated with it. And, the distribution of elements with nodes is guaranteed to be smooth. The result is a structurally sound model. The tessellation of the present invention differs from other geodesics in that it is designed for a thick-walled ellipsoid model.

Figure 7A:
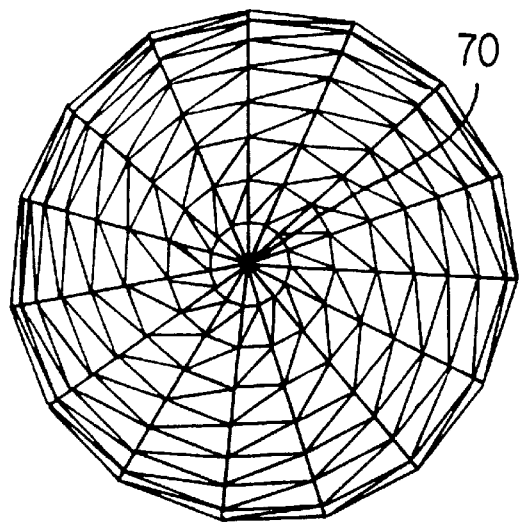
FIGS. 7a and 7b illustrate a comparison of different model tessellations.
Figure 7B:
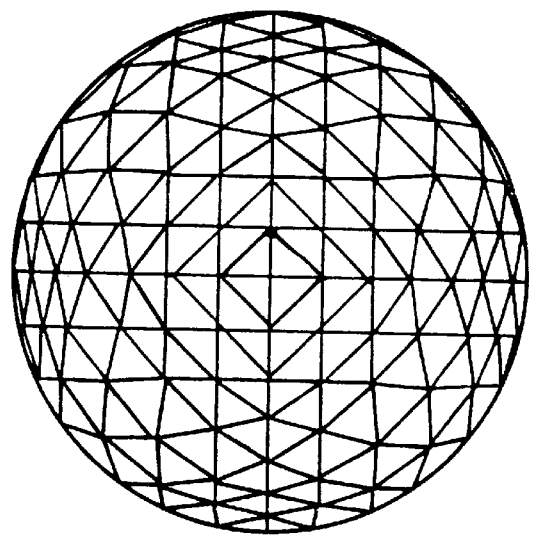

FIGS. 7a and 7b illustrate a comparison of different model tessellations. FIG. 7a illustrates a tessellation based on sealing the end of a tube at a single point. Note that twelve triangular surface elements (underlying prismoidal elements not shown) meet at a single point at the apex 70 as compared to an average of six elsewhere. FIG. 7b illustrates a geodesic based tessellation of the model.

Figure 8:
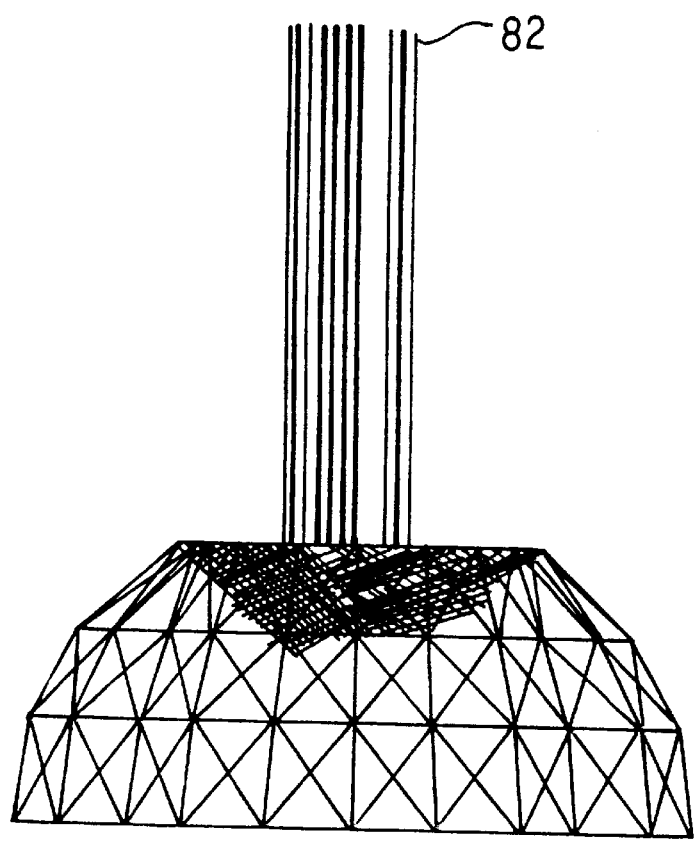
FIG. 8 illustrates a model breaking under high stress during recovery.

The tessellation of the present invention has significant advantages over the so-called sealed tube approach as described by D. Terzopoulos and D. Metaxas, by J. Park, D. Metaxas and A. Young, by T. McInerney and D. Terzopoulos in "A Finite Element Model For 3d Shape Reconstruction And Nonrigid Motion Tracking", *IEEE ICCV*, pages 518–523, 1993, and by O'Donnell, Gupta, and Boult in which several model elements may meet at a single node as illustrated in FIG. 7a. In the sealed tube approach, there is no inherent bound on the number of elements associated with the apex node. This may be problematic if the model undergoes deformations under material constraints (e.g., minimal strain) since stress will be focused on that node. This is illustrated in FIG. 8. At junctures where several elements meet at a single node, the model is at its weakest. Typically, the model tessellated using the sealed tube approach invariably breaks at this junction under conditions of high stress. FIG. 8 illustrates a model breaking under high stress during recovery. The breakage initiates at the apex (not shown) of the model where twelve elements meet. Note that the top 82 of the figure is clipped. It is shown below that this situation results in instability and this instability increases with the degree of tessellation. Since a relatively dense tessellation is needed to describe complicated shapes, this limits the effectiveness of the sealed tube approach.

Figures 9A, 9B:
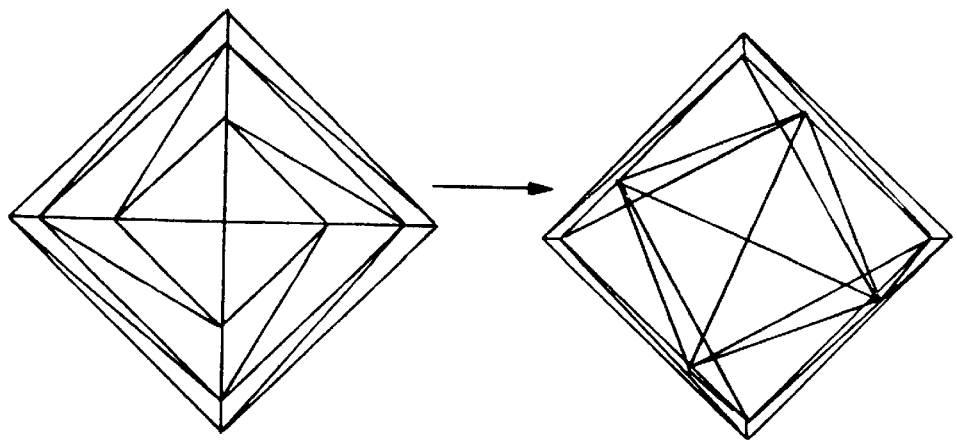
FIGS. 9a and 9b illustrate that under both the minimal stretching and constant volume constraints, the sealed tube tessellation is biased towards twisting- even in the absence of data.

Another structural bias of the sealed tube approach results in an undesired twisting of the model. This is illustrated in FIGS. 9a and 9b. Under both the minimal stretching and constant volume constraints, the sealed tube tessellation is biased towards twisting even in the absence of data. FIG. 9a illustrates the model prior to the application of the minimal stretching constraint as viewed from the apex. FIG. 9b illustrates the model distorting under this constraint. The minimal stretching constraint (Equation 3), for example, attempts to maintain initial element edge lengths. In the body of the mesh these constraints are balanced. At the apex, however, there is a resultant bias which causes a differential rotation. (Note that this effect also occurs when using the constant volume constraint).

The model is tessellated under different schemes for different stages of the recovery process. All of these alternative tessellations are variants of the geodesic approach described above. For fitting to contour data, the surfaces of the model are tessellated with planar triangular elements. For simplifying the reconstruction of the tag movement and the calculation of model strain, each prismoidal element above is broken down into three tetrahedral subelements. These alternating tessellations (prismoidal, planar triangular surface, tetrahedral) are independent of one another.

Constraints on deformation are necessary for recovering cardiac motion in a clinical setting. A very dense tagged-MR acquisition (five short axis plus five long axis slices) may take up to two hours. This duration in general is thought to be unacceptable (O. Simonetti PhD. Personal Correspondence, 1995). In order to estimate the motion with less data, some form of "regularization" must be imposed on the model.

The minimal stretching constraint as described by O'Donnell, Gupta, and Boult encourages smooth deformations from an initial shape by attempting to maintain inter-nodal distances. It may be used with volumetric as well as planar surface elements. For the present invention, it is employed only on the surface of the model in order to recover a smooth shape.

$$\varepsilon_s = k_s \sum_{elements} \sum_{edges} (Length_{current} - Length_{initial}) / Length_{initial} \quad (3)$$

where $k_s$ scales the constraint.

The following will describe constant volume constraint of the present invention. Given that heart tissue is predominantly water, its application is appropriate because of incompressibility. Like the minimal stretching constraint, the effect is to smooth the model deformations.

This constraint seeks to minimize the overall change in element volume.

$$\partial Volume/\partial nodes = 0 \quad (4)$$

Since the above minimization is unconstrained, the element vertices are enforced to deform toward or away from the centroid of the element.

The constant volume constraint is applied when the difference in volume over time falls above a threshold. Since the cardiac vessels contract and expand over the cycle, the volume of a region of tissue may not be exactly constant but may be assumed to be approximately the same.

Constant volume forces are especially useful when one or more components of the data motion are unknown, a common characteristic of tagged MR acquisitions. Constant volume constraints allow the model to infer the missing components of motion, something that minimal stretching constraints do much less reliably depending on the element configuration.

Figure 10:
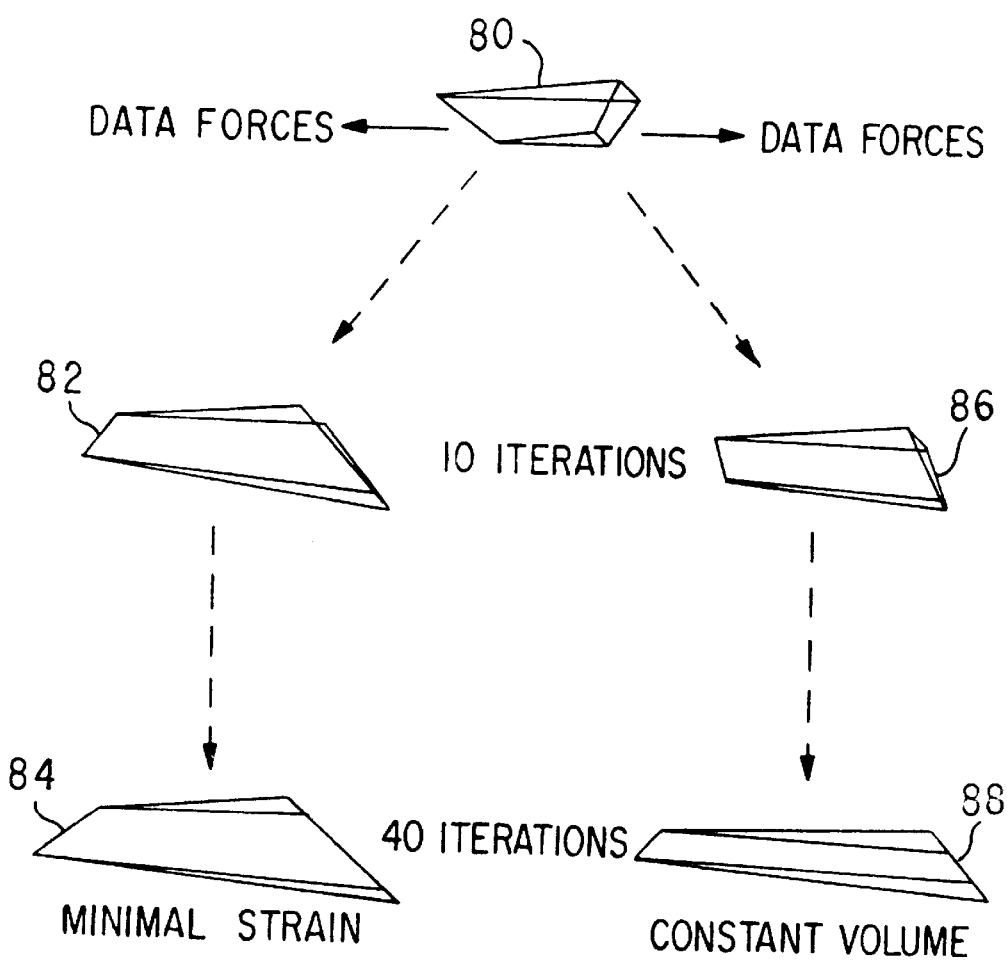
FIG. 10 illustrates a comparison of minimal volumetric stretching and constant volume constraints as computed by the present invention.

FIG. 10 illustrates a comparison of minimal volumetric stretching and constant volume constraints as computed by the present invention. Data forces are applied to pull the bottom corners out of the original shape 80. The resulting deformation using minimal stretching constraints is shown for 10 iterations 82 and for 40 iterations 84. Note that the volume increases dramatically. The resulting deformation using constant volume constraints is shown for 10 iterations 86 and for 40 iterations 88. As the sides bulge, the element flattens.

To discourage local deformations from explaining aspects of the data that could be described by the default model, a deformation penalty is applied $$\iiint k_{DisplPenalty} d(u, \vec{v}, \alpha) du\, dv\, d\alpha \quad (5)$$

where $d(u, \vec{v}, a)$ is the deformation from the (scaled) default model.

Because of this deformation penalty, the final fit may not interpolate the data. If the actual shape of the data deviates from the scaleable default shape, a balance will be struck between the two. To cause the model to favor the default model, a high value of $k_{DisplPenalty}$ may be applied. This implies a strong confidence in the expected shape. Similarly, the final fit can be made to virtually interpolate the data via a low deformation penalty. This is appropriate in the case where the default model has little certainty associated with it as described by S. D. Fenster, T. E. Boult and T. O'Donnell in "Physics In A Fantasy World vs. Robust Statistical Estimation", T. Boult, M. Hebert, J. Ponce and A. Gross, editors, 3D Object Representation For Computer Vision, pages 227–296, Springer-Verlag, 1995.

Constant volume constraints are employed over volumetric minimal stretching because in areas of the model where one or more components of the motion is unknown, a stretching penalty may not influence the shape of the model in a proper way. For example, if the LV model is known to compress in the x direction, it is expected to bulge in the y and z directions to compensate for the absence of any other information. Stretching penalties will not necessarily affect this result whereas constant volume constraints will.

The goal of recovery as stated above is two-fold. It is desired to calculate internal strain in the heart as well as recover some of the global characteristics of its movement. Recovery takes place over two main stages. For details see O'Donnell, Gupta, and Boult.

Prior to the recovery from a specific dataset, a default model must be created. This may be done by fitting the base global model to a set of contour data and allowing the parametric offsets to deform. Since the initial model for these fits is the base global model, it may be necessary to edit the fitting by hand since proper model-data correspondences may not be made.

Recovery of a specific tagged-MR dataset is composed of two stages. First, the default model is applied to a dataset and allowed to scale. Following this, displacements are used to recover differences between the resulting scaled default model and the data. To estimate the full 3-D motion, it is necessary to simultaneously deform a single model (the HVV) with data from two orthogonal acquisitions. Model deformation at all stages follow the approach developed by D. Terzopoulos and D. Metaxas by minimizing the energy of the model-data system.

The stability of the tessellation of the present invention was tested by comparing it with the sealed tube tessellation found in O'Donnell, Gupta, and Boult. The outer walls of both models were fit to a densely sampled (121 datapoints) thick hemisphere 20% larger in size. Fitting was done with the minimal volumetric stretching constraint set to an extremely high degree ($k_s=10$), guarantying breakage. Table 1 shows the results. Breakpoint indicates the number of iterations at which the model collapses (see FIG. 8). The higher the breakpoint number, the more stable the model is to deformation. The sealed tube tessellation is described by u and v, the number of nodes in the latitudinal and longitudinal directions respectively.

TABLE 1

A comparison of model stability under the
sealed tube and geodesic tessellation schemes.

| Sealed Tube | | Thick Geodesic | |
|---|---|---|---|
| Tessellation | Breakpoint | Tessellation | Breakpoint |
| u = 4, v = 4 12 elm;1 node | 750 | 17 surf elms 6 elm; 1 node | 1250 |
| u = 6, v = 8 24 elm;1 node | 150 | 92 surf elms 6 elm; 1 node | 600 |
| u = 10, v = 15 45 elm;1 node | 55 | 316 surf elms 6 elm; 1 node | 300 |

From the table, two trends are apparent. First, that the stability goes down as the number of elements goes up. This is due to the fact that a larger mesh requires more propagation time to settle. Second, for reasons already discussed, the stability of the sealed tube tessellation goes down much quicker than the geodesic tessellation.

Note also that the (u=4, v=4) tessellation of the sealed tube is relatively stable compared to the other sealed tube tessellations. This is because the element to node ratio is relatively constant over the entire model. Thus, there is no "weak point".

Figure 11:
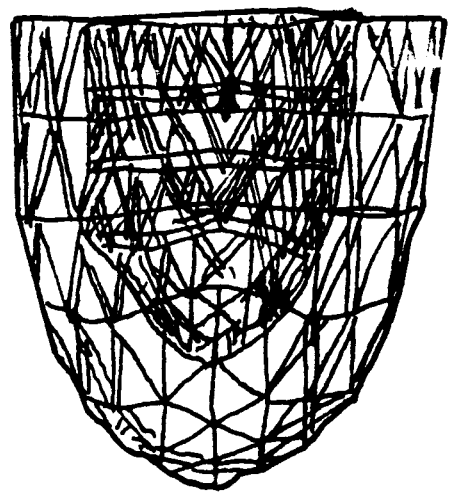
FIG. 11 illustrates the default LV model recovered using three different volunteer datasets.

The default LV model was recovered by fitting a base global model to a merged set of three segmented LV contour datasets. The datasets were from different volunteers and registered by hand using rigid-body rotations as well as scaling. All were from the ED) phase of the cardiac cycle. Two contained short-axis information and one contained long axis information. Some minor editing of the fit was necessary. The results are shown in FIG. 11 which illustrates the default LV model recovered using 3 different volunteer datasets. The model is in the ED phase of the cardiac cycle.

The default model is applied to segmented tag intersections as described by G. Funka-Lea and A. Cupta in "The Use Of Hybrid Models To Recover Cardiac Wall Motion In Tagged MR Images", *IEEE CVPR*, 1996, extracted from long and short axis images. All images were acquired on a Siemens MAGNETOM Vision 1.5 T MRI system with a standard 25 mT/m gradient system. An ECG triggered 2-D gradient echo cine pulse sequence with velocity compensation was utilized. In-plane resolution was 1.74*1.17 mm and slice thickness was 10 mm. The tag grid was applied within 20 msec immediately following the R-wave trigger. The tags were 2 mm wide and spaced 9 mm apart. Six cardiac phases were acquired, covering from ED to ES with 60 msec. temporal resolution. Identical imaging parameters were used for the long-axis and short-axis acquisitions.

Figure 12A:
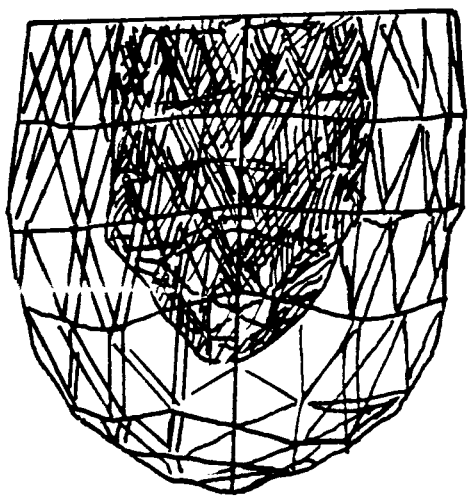
FIGS. 12a and 12b illustrate final fits to volunteer data for the ED and ES phases respectively.
Figure 12B:
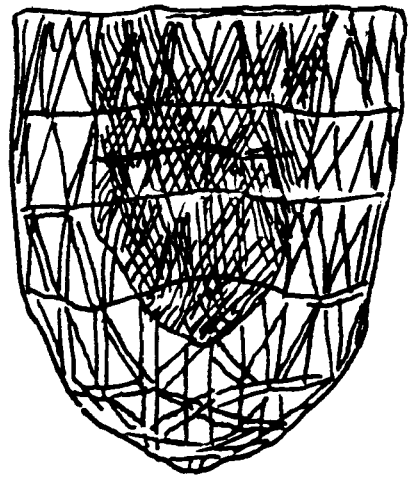

The results of fitting the models to the data are shown for ED and ES in FIGS. 11a and 11b and Table 2. FIGS. 12a and 12b illustrate final fits to volunteer data for the ED (FIG. 12a) and ES (FIG. 12b) phases.

TABLE 2

| Param | Meaning | ED | ES |
|---|---|---|---|
| $al_{inner}$ | Endocardial rad | 2.66 cm | 2.58 cm |
| $al_{outer}$ | Epicardial Wall | 4.81 cm | 4.82 cm |
| $a3_{inner}$ | Apex to base | 6.64 cm | 6.41 cm |
| $taper_x$ | X-axis Tapering | −0.21 cm | −0.11 cm |
| $twist_{inner}$ | Endocardial twist | 0.00 | 0.016 |

Figure 13:
FIG. 13 illustrates the eigenvalues of the principle components of the strain tensor of the LV at end systole.

Strain was found to be much higher closer to the base of the LV with an average eigenvalue corresponding to the principle component of strain of 1.20 as compared with 0.93 towards the apex. This is illustrated in FIG. 13 which is a display of the eigenvalues of the principle components of the strain tensor of the LV at end systole. The dark regions represent regions of low strain and the light regions represent regions of high strain. The average RMS error of the tag intersection displacements was found to be 0.83 mm and the decrease in volume from ED to ES was 9%.

From the above, it has been shown that the inclusion of parametric offsets can aid in object recovery by creating a default model shape more expressive and more easily scaled than hybrid model formulations of the prior art. The model tessellation of the present invention has been shown to provide more stability in fitting than a simplistic sealed cylinder tessellation. Also, it has been shown how constant volume constraints may be used in the recovery of cardiac motion. The new model form was tested on the recovery of 3-D strain and motion from a tagged-MR acquisition.

It is not intended that the present invention be limited to the hardware or software arrangement, or, operational procedures shown disclosed. This invention includes all of the alterations and variations thereto as encompassed within the scope of the claims as follows.

We claim:

1. A cardiac motion recovery system comprising:
   an overall model that receives tagged MR images and provides analysis of 3D motion;
   a tesselator connected to said overall model for tessellating said overall model; and,
   constant volume constraint means connected to said overall model; wherein said overall model comprises:
      extraction means for extracting from a data set a gross description of shape and movement for comparison and classification via global parameters; and,
      retention means for retaining a detailed description of data for geometric measurements.

2. A cardiac motion recovery system as claimed in claim 1 wherein said overall model comprises:
   a scaleable default model;
   an overall model builder for receiving said tagged MR images; and,
   local deformations.

3. A cardiac motion recovery system as claimed in claim 2 wherein said scaleable default model comprises:
   a global component; and,
   parametric offsets.

4. A cardiac motion recovery system as claimed in claim 3 wherein said parametric offsets comprise:
   default means for creating a default shape which resembles an object undergoing recovery therefore regions where data is sparse are more likely to be estimated correctly.

5. A cardiac motion recovery system as claimed in claim 3 wherein said parametric offsets comprise:
   forming means for forming an expected model shape which facilitates appropriate model data correspondences; and,
   scaling means for scaling with said global component to maintain an expected shape even in a presence of large global deformations.

6. A cardiac motion recovery system as claimed in claim 3 wherein said parametric offsets comprise:
   a trio $(u_{off}, v_{off}, \alpha_{off})$ plus a point of attachment and an offset vector calculated by evaluating said global component at $(u_{off}, v_{off}, \alpha_{off})$, and taking a vector difference with said point of attachment $(u_{attach}, v_{attach}, \alpha_{attach})$.

7. A cardiac motion recovery system as claimed in claim 3 wherein:
   said global component is augmented with tapering (along x and y axes), bending and twisting using variations of formulations.

8. A cardiac motion recovery system as claimed in claim 2 wherein said local deformations comprise:
   tailoring means for tailoring said scaleable default model to a specific dataset if scaled default shape does not approximate data.

9. A cardiac motion recovery system as a: claimed in claim 1 wherein:
   said overall model is capable of describing an expected configuration which facilitates appropriate model scaling as well as proper model-data correspondences.

10. A cardiac motion recovery system as claimed in claim 1 wherein:
    said overall model is implemented as a solid, thick-walled ellipsoid model.

11. A cardiac motion recovery system as claimed in claim 1 wherein said overall model comprises:
    fusion means for fusing acquisitions of a heart taken from different views registered in time using a model-based approach.

12. A cardiac motion recovery system as claimed in claim 1 wherein:
    said tessellator describes said overall model by discrete nodes linearly interpolated to form prismoidal elements which are arranged in a unique configuration based on a geodesic dome.

13. A cardiac motion recovery system as claimed in claim 1 wherein said tessellator comprises:
    structural means for providing structural support by basing a nodal distribution on geodesic domes.

14. A cardiac motion recovery system as claimed in claim 1 wherein said constant volume constraint means comprises:
    motion means for inferring motion of left ventricle where tag intersections are sparsely distributed.

15. A cardiac motion recovery system as claimed in claim 1 wherein said tessellator comprises:
    linking means for linking a first geodesic dome and a second geodesic dome wherein said first geodesic dome describes an inner wall of a left ventricle and said second geodesic dome describes an outer wall of said left ventricle.

16. A cardiac motion recovery system as claimed in claim 1 wherein said tessellator comprises:
    linking means for linking a plurality of geodesic domes.

17. A method of recovering cardiac motion comprising the steps of:
    receiving tagged MR images of LV's;
    receiving tagged MR images of a specific LV;
    obtaining an overall model;
    tessellating said overall model;
    constraining constant volume; and,
    providing analysis of 3D LV motion; wherein obtaining an overall model comprises the steps of:
        extracting from a data set a gross description of shape and movement for comparison and classification via global parameters; and,
        retaining a detailed description of data for geometric measurements such as surface area and material strain.

18. A method of recovering cardiac motion as claimed in claim 17 wherein tessellating said overall model comprises the step of:
    linking a first geodesic dome and a second geodesic dome wherein said first geodesic dome describes an inner wall of a left ventricle and said second geodesic dome describes an outer wall of said left ventricle.

* * * * *